(12) United States Patent
Legaré et al.

(10) Patent No.: US 11,237,052 B2
(45) Date of Patent: Feb. 1, 2022

(54) SYSTEM AND METHOD FOR INFRARED SPECTROMETRY

(71) Applicant: INSTITUT NATIONAL DE LA RECHERCHE SCIENTIFIQUE, Quebec (CA)

(72) Inventors: François Legaré, Saint-Eustache (CA); Bruno Schmidt, Montreal (CA)

(73) Assignee: INSTITUT NATIONAL DE LA RECHERCHE SCIENTIFIQUE

( * ) Notice: Subject to any disclaimer, the term of this patent is extended or adjusted under 35 U.S.C. 154(b) by 59 days.

(21) Appl. No.: 16/956,604

(22) PCT Filed: Dec. 10, 2018

(86) PCT No.: PCT/CA2018/051571
§ 371 (c)(1),
(2) Date: Jun. 21, 2020

(87) PCT Pub. No.: WO2019/119113
PCT Pub. Date: Jun. 27, 2019

(65) Prior Publication Data
US 2020/0400497 A1    Dec. 24, 2020

Related U.S. Application Data

(60) Provisional application No. 62/608,026, filed on Dec. 20, 2017.

(51) Int. Cl.
*G01J 3/40* (2006.01)
*G01J 3/10* (2006.01)
*G01J 1/42* (2006.01)
*G01J 3/02* (2006.01)

(52) U.S. Cl.
CPC ............... *G01J 3/108* (2013.01); *G01J 1/42* (2013.01); *G01J 3/0205* (2013.01)

(58) Field of Classification Search
CPC .... G01J 3/18; G01J 3/02; G01J 3/2803; G01J 3/1804; G01J 3/2823
USPC ....................................................... 356/305
See application file for complete search history.

(56) References Cited

U.S. PATENT DOCUMENTS

| | | | |
|---|---|---|---|
| 6,778,746 B2 * | 8/2004 | Charlton | B82Y 20/00 385/122 |
| 7,008,559 B2 | 3/2006 | Chen | |
| 7,973,936 B2 | 7/2011 | Dantus | |
| 8,669,512 B2 | 3/2014 | Nevet et al. | |
| 2005/0070803 A1 | 3/2005 | Cullum et al. | |

FOREIGN PATENT DOCUMENTS

| WO | 2005001900 A3 | 10/2005 |
|---|---|---|
| WO | 2006132967 A3 | 2/2007 |

* cited by examiner

*Primary Examiner* — Md M Rahman
(74) *Attorney, Agent, or Firm* — Lavery, De Billy, LLP; Gwendoline Bruneau

(57) ABSTRACT

A system and a method for infrared spectrometry, the method comprising multiphoton absorption with a material positioned in the Fourier plane of a 2f setup, the material being one of: i) a visible light sensitive, high band gap material and ii) an IR sensitive material. The system comprises one of: i) a visible light sensitive, high band gap material and ii) an IR sensitive material, positioned in the Fourier plane of a 2f setup.

19 Claims, 3 Drawing Sheets

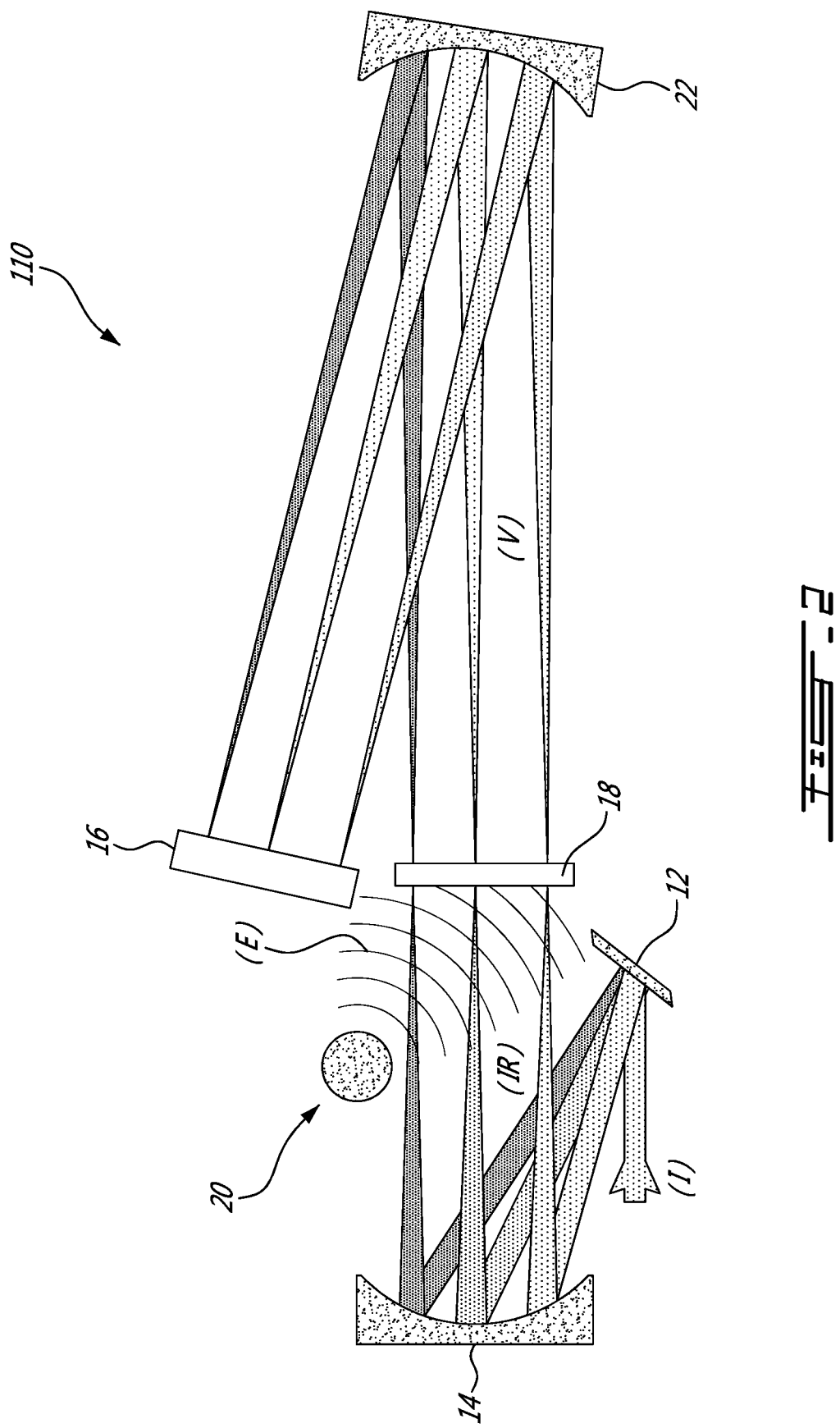

SYSTEM AND METHOD FOR INFRARED SPECTROMETRY

CROSS-REFERENCE TO RELATED APPLICATIONS

This application is a National Entry Application of PCT application no PCT/CA2018/051571 filed on Dec. 10, 2018, and published in English under PCT Article 21(2), which itself claims benefit of U.S. provisional application Ser. No. 62/608,026, filed on Dec. 20, 2017. All documents above are incorporated herein in their entirety by reference.

FIELD OF THE INVENTION

The present invention relates to infrared spectrometry. More specifically, the present invention is concerned with a system and a method for infrared spectrometry.

BACKGROUND OF THE INVENTION

To detect electromagnetic radiation, a material with a band gap lower than the photon energy is needed. Thus, for low photon energies, materials with low band gap are used for detection. In the case of silicon, with a high band gap around 1.1 eV, the longest wavelength detectable is slightly above 1000 nm. In the ultraviolet, visible and near infrared (UV-VIS-NIR) spectral range, typically in the range between about 200 nm an about 1100 nm, array-based spectrometers use silicon detectors.

In the infrared (IR) range, typically above 1100 nm, materials with lower band gaps, typically below about 1.1 eV, are needed for detecting the electromagnetic radiation. Thus, for example, Indium Gallium Arsenide (InGaS) is used for the spectral range between 850 nm and 2500 nm. IR spectrometers using such low bang gap materials are not only expensive, their arrays also contain a low number of pixels, typically 256, with a maximum of 512. Moreover, they suffer from bad signal to noise ratio compared to silicon-based spectrometers. Increasing the number of pixels may be achieved by stacking multiple InGaS detector arrays for example. Cooling is required to reduce noise. This increases the cost of the spectrometers. As low band gap materials are thermally excited at room temperature, cooling is required, which significantly increases the complexity and the price of IR spectrometers above 1100 nm.

There is still a need in the art for a system and a method for IR spectrometry.

SUMMARY OF THE DISCLOSURE

More specifically, in accordance with the present disclosure, there is provided a method for detecting IR light, comprising multiphoton absorption with a first material positioned in the Fourier plane of a 2f setup.

There is further provided a use of one of: i) a visible light sensitive, high band gap material and ii) an IR sensitive material, for detecting IR light, comprising multiphoton absorption in the Fourier plane of a 2f setup.

There is further provided a method for characterization of an IR pulsed laser spectrum, comprising positioning a high band gap detector in the Fourier plane of a 2f setup for nonlinear interaction of IR pulsed laser beams with the high band gap material, causing multiphoton absorption within the high band gap material, thereby exciting the high band gap material above the band gap.

There is further provided an infrared spectrometer, comprising, in the Fourier plane of a 2f setup, one of: i) a visible light detector and ii) a IR light detector.

Other objects, advantages and features of the present disclosure will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2 is a diagrammatic view of an IR spectrometer according to another embodiment of an aspect of the present disclosure.

DESCRIPTION OF ILLUSTRATIVE EMBODIMENTS

The present invention is illustrated in further details by the following non-limiting examples.

According to an embodiment of an aspect of the present disclosure, an IR pulsed laser spectrum is characterized using a high band gap detector positioned in the Fourier plane of a 2f setup for nonlinear interaction of IR pulsed laser beams with the high band gap material of the detector, causing multiphoton absorption within the high band gap material, thereby exciting the high band gap material above the band gap.

Multiphoton absorption occurs as a 2-, 3- or 4-photon process in a non-resonant process in the high band gap material, or in a resonant process when the high band gap material is modified by doping or by providing a coating of metallic nanoparticles or fluorescent dyes for example.

According to embodiments of an aspect of the present disclosure, IR spectrometer systems 10, 100 and 200 as illustrated for example in FIG. 1 comprise a dispersive optic 12, which spreads out the wavelengths of an IR input spectrum (I), a high band gap detector 16 and an imaging optic 14 that images the IR wavelengths onto the high band gap detector 16.

The dispersive optic 12 may be as a prism, grating or grism for example.

Figure 1A:
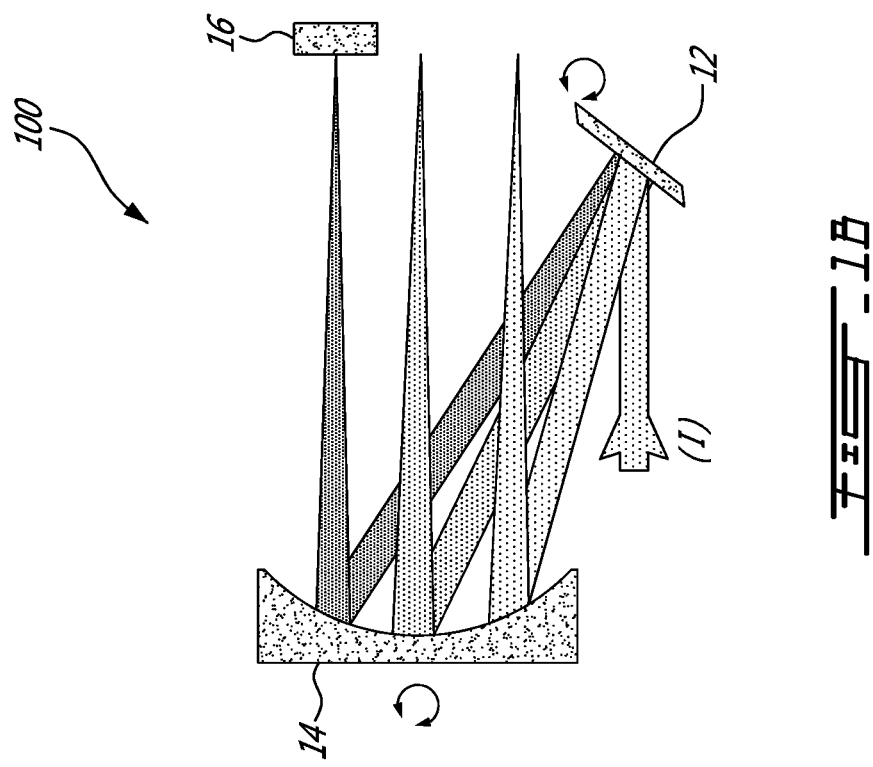
FIG. 1A is a diagrammatic view of an IR spectrometer according to an embodiment of an aspect of the present disclosure.
Figure 1B:
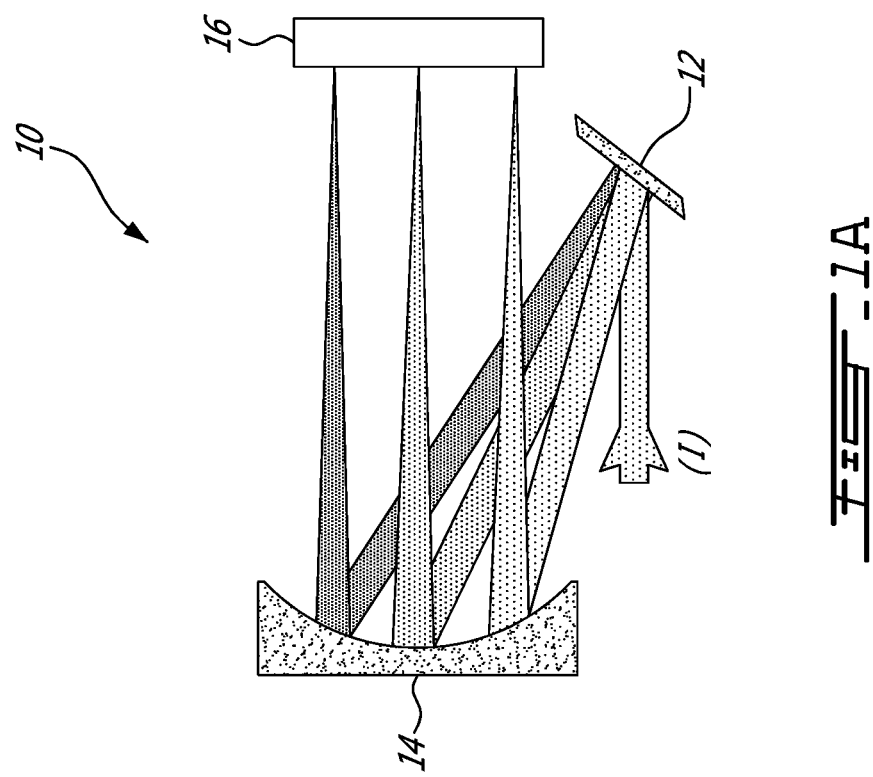
FIG. 1B is a diagrammatic view of an IR spectrometer according to another embodiment of an aspect of the present disclosure.

The detector 16 may be a segmented light detector, such as a charged-couple-device (CCD) or complementary metal-oxide semiconductor (CMOS) array for instance (see FIG. 1A). The detector 16 may be a translatable, single element light, such as a single diode detector (see FIG. 1B). As people in the art will appreciate, silicon having a band gap around 1.1 eV, is usually used for detection of wavelength detectable below about 1000 nm. Silicon is used here as an example of a high band gap material.

The dispersive optic 12 and/or the imaging optic 14 may be rotated (see FIG. 1B) to change the distribution of spectral components incident onto the detector 16.

Figure 1C:
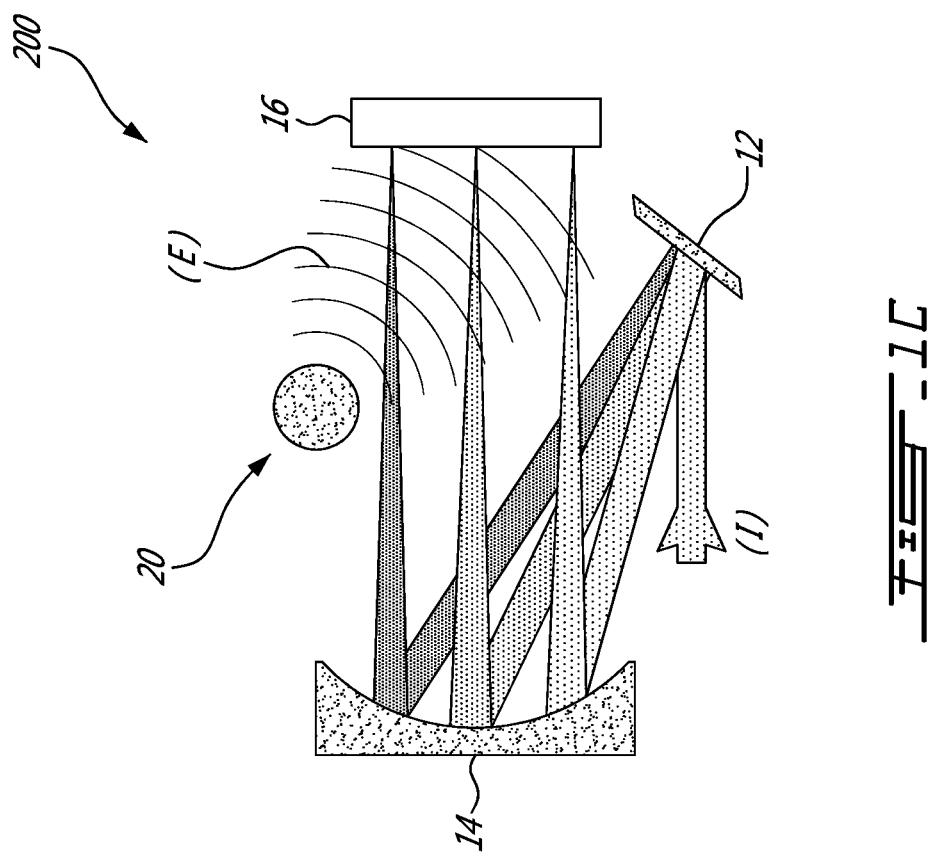
FIG. 1C is a diagrammatic view of an IR spectrometer according to another embodiment of an aspect of the present disclosure.

In an embodiment illustrated for example in FIG. 1C, the high band gap detector 16 may be activated by the combination of the low photon energy IR light (I) and a beam (E)

from a continuous excitation light source 20. The excitation light (E) allows to overcome the high band gap of the detector 16. The continuous excitation light source 20 may be coherent or incoherent. The excitation light source 20 may be a UV lamp or a cw laser for example.

As shown in FIG. 2, the multi photon interaction may occur on an intermediary material 18 positioned in the Fourier plane of the 2f setup, such that each incident IR wavelength excites its specific position to emit a wavelength different than the incident IR wavelength. The different re-emitted wavelengths are then re-imaged onto the high band gap detector 16 using an imaging optic 22.

The intermediary material 18 may be any material that can be excited by IR light, or become transparent under IR light illumination. The intermediary material 18 converts the undetectable IR light (I) to detectable light (V) that can be detected with the high band gap material 16.

The intermediary material 18 may be a saturable absorber.

The intermediary material 18 may be thermally excited by the IR light.

The band gap of the intermediary material 18 may be higher than the band gap of the high band gap detector 16. For example, the intermediary material 18 is selected so that it converts invisible IR light to visible light, which in turn is detected by the high band gap detector 16. While a typical band gap for the detector 16 may be around 1.1 eV in the case of silicon for IR light up to 3 μm for example, the band gap of the intermediary material 18 may be up to twice the band gap of the detector, for example up to 2 eV. For example, in case of a Si detector 16, the intermediary material 18 may be selected a photosensitive liquid crystal.

The intermediary material 18 may be selected as a durable ceramic-like material to avoid photo bleaching. The intermediary material 18 may consist of IR sensitive phosphors. The intermediary material 18 may consist of rare-earth-doped materials which can upconvert infrared radiation to the visible region.

The intermediary material 18 may have a band gap lower than the band gap of the detector 16. For example, transparency under IR excitation may be optically induced; IR excited, optically transparent regions are thus created, which let pass, at their specific spatial points, a detectable light from the excitation source. These IR induced transparency regions are then imaged onto the high band gap detector 16 by means of an excitation light (E) from a continuous excitation light source 20.

The intermediary material 18, may be pre-excited under the IR beam and further excited by the continuous excitation light source 20, emitting a light that can be detected by the detector 16. The intermediary material 18 is subsequently re-imaged onto the detector 16, using the re-imaging optic 22. The intermediary material 18 may be re-imaged in transmission, as is shown in FIG. 2, or in reflection (not shown). The continuous excitation light source 20 may be coherent or incoherent. The excitation light source 20 may be a lamp or a cw laser for example.

Using such intermediary material 18 converting IR light allows using a detector 16 that cannot detect IR light.

Thus, a standard visible light material, such as silicon for example, of a band gap above about 1.1 eV, is used for detection in wavelength regions in which it is usually blind, from about 1 μm up to at least 3 μm, by nonlinear interaction with an IR incident beam that induces a 2-, 3- or 4-photon absorption.

To detect light up to at least 7 μm, a multi photon effect in a typical IR detector such as InGaS for example, may be used. All embodiments as described hereinabove may be applied in the far IR range.

The present IR detector system and method allow increased resolution as, the maximum pixel number for IR arrays being 512, they can provide 2048 or 4096 pixels.

The present IR detector system and method allow an enhanced signal to noise ratio since they are not as sensitive to heat as typical IR detectors.

IR pulsed laser are becoming widely commercially available and there is a need for high spectral resolution low noise spectrometers in this spectral range. Using multiphoton absorption in high band gap materials, highly sensitive, high spectral resolution spectrometers may thus be built for the spectral range above 1100 nm, with possibility up to about 3200 nm by absorption of 3 photons, for example. Such spectrometers are relatively unexpansive compared to current technologies such as spectrometers based on InGaAs, while providing improved specifications for IR pulsed laser.

The scope of the claims should not be limited by the embodiments set forth in the examples, but should be given the broadest interpretation consistent with the description as a whole.

The invention claimed is:

1. A method for detecting IR light, comprising multiphoton absorption with a first material positioned in the Fourier plane of a 2f setup, wherein the first material is a high band gap material, said method comprising nonlinear interaction of IR light with the high band gap material, causing multiphoton absorption within the high band gap material, thereby exciting the high band gap material above band gap.

2. The method of claim 1, the method comprising exiting the high band gap material with a combination of the IR light and a beam from a continuous excitation light source.

3. The method of claim 1, wherein the first material is one of: i) a doped high band gap material, and ii) a coated high band gap material.

4. The method of claim 1, comprising spreading wavelengths of an input IR beam, and imaging the wavelengths onto the high band gap material.

5. The method of claim 1, comprising positioning a high band gap material in the Fourier plane of a 2f setup, spreading wavelengths of an input IR beam, imaging the wavelengths onto the high band gap material and changing a distribution of spectral components incident onto the high band gap material.

6. The method of claim 1, the method comprising spreading wavelengths of an input an input IR beam by a dispersive optic, imaging the wavelengths onto the high band gap material by an imaging optic, and changing the distribution of spectral components incident onto the high band gap material by rotating at least one of the dispersive optic and the imaging optic.

7. The method of claim 1, wherein the first material is one of: i) a segmented, light-sensitive, high band gap material and ii) a single element, light-sensitive, high band gap material.

8. The method of claim 1, wherein the first material is excited under the IR light, the method comprising imaging the first material onto a second high band gap material.

9. The method of claim 1, wherein the first material is pre-excited under the IR light, the method comprising further exciting the first material with a continuous excitation light source; and imaging the first material onto a second high band gap material.

10. The method of claim 1, wherein the first material absorbs the IR light and an additional excitation light.

11. Use of one of: i) a visible light sensitive, high band gap material and ii) an IR sensitive material, for detecting IR light, comprising multiphoton absorption in the Fourier plane of a 2f setup, wherein the first material is a high band gap material, said method comprising nonlinear interaction of IR light with the high band gap material, causing multiphoton absorption within the high band gap material, thereby exciting the high band gap material above band gap.

12. Use of claim 11, comprising positioning the visible light sensitive, high band gap material in the Fourier plane of the 2f setup.

13. Use of claim 11, comprising positioning a first material excited under IR light in the Fourier plane of the 2f setup and imaging the first material onto a high bang gap material.

14. A method for characterization of an IR pulsed laser spectrum, comprising positioning a high band gap detector in the Fourier plane of a 2f setup for nonlinear interaction of IR pulsed laser beams with the high band gap material, causing multiphoton absorption within the high band gap material, thereby exciting the high band gap material above the band gap.

15. An infrared spectrometer, comprising, in the Fourier plane of a 2f setup, one of: i) a visible light detector and ii) a IR light detector, a first high band gap material being positioned in the Fourier plane of the 2f setup, said method comprising nonlinear interaction of IR light with the first high band gap material, causing multiphoton absorption within the first high band gap material, thereby exciting the first high band gap material above band gap.

16. The infrared spectrometer of claim 15, wherein said visible light detector has a band gap of at least 1.1 eV.

17. The infrared spectrometer of claim 15, comprising:
a dispersive optic, said dispersive optic spreading wavelengths of an input IR beam, and
an imaging optic, said imaging optic imaging the wavelengths onto the visible light detector.

18. The infrared spectrometer of claim 15, comprising:
a dispersive optic, said dispersive optic spreading wavelengths of an input IR beam, and
an imaging optic, said imaging optic imaging the wavelengths onto the visible light detector;
wherein at least of said dispersive optic and said imaging optic is rotatable.

19. The infrared spectrometer of claim 15, wherein the first material is exited under the IR light in the Fourier plane of the 2f setup, the system comprising a second high band gap material and an imaging optic, said imaging optic imaging the first material onto the second high band gap material.

* * * * *